United States Patent [19]
Fuerst et al.

[11] Patent Number: 5,248,278
[45] Date of Patent: Sep. 28, 1993

[54] VENTILATOR ROOF FOR VEHICLES

[75] Inventors: Arpad Fuerst, Germering; Thomas Schreiter, Munich; Burkhard Reinsch, Neuried; Werner Paetz, Freising, all of Fed. Rep. of Germany

[73] Assignee: Webasto AG Fahrzeugtechnik, Stockdorf, Fed. Rep. of Germany

[21] Appl. No.: 729,380

[22] Filed: Jul. 12, 1991

[30] Foreign Application Priority Data

Jul. 19, 1990 [DE] Fed. Rep. of Germany ....... 4022928

[51] Int. Cl.⁵ .......................... B60H 1/24; B60J 7/053
[52] U.S. Cl. .................... 454/129; 454/137; 454/139; 454/900
[58] Field of Search ............... 454/129, 136, 137, 139, 454/140, 162, 900

[56] References Cited

U.S. PATENT DOCUMENTS

| | | | |
|---|---|---|---|
| 4,633,769 | 1/1987 | Milks | 454/162 X |
| 4,658,597 | 4/1987 | Shum | 454/900 X |
| 4,911,497 | 3/1990 | Schreiter et al. | 454/136 X |
| 5,003,866 | 4/1991 | Ricci | 454/136 X |

FOREIGN PATENT DOCUMENTS

| | | |
|---|---|---|
| 0382123 | 8/1990 | European Pat. Off. . |
| 3540546 | 10/1990 | Fed. Rep. of Germany . |
| 132407 | 6/1986 | Japan ................... 454/136 |
| 132408 | 6/1986 | Japan ................... 454/137 |
| 118716 | 1/1989 | Japan . |

*Primary Examiner*—Harold Joyce
*Attorney, Agent, or Firm*—Sixbey, Friedman, Leedom & Ferguson

[57] ABSTRACT

Ventilator roof for use in motor vehicles with a roof opening in a fixed roof surface which can be closed by a cover. The cover can be swung by pivoting around a pivoting axis, at, or near its rear edge, into a ventilation position in which the cover front edge is below the roof surface, while the cover rear edge is kept at the height of the roof surface, and a ventilation gap is formed between the cover front edge and the front edge of the roof opening. At least one electrically powered blower is built into a ventilation channel leading from the ventilation gap into the vehicle interior. The blower can be powered by solar cells or the on-board vehicle power unit (battery) with safeguards to prevent use when the vehicle power unit lacks sufficient charge. In some embodiments, arrangements are also provided to enable the blower to provide ventilation of the interior space of the vehicle even when the cover is closed.

21 Claims, 9 Drawing Sheets

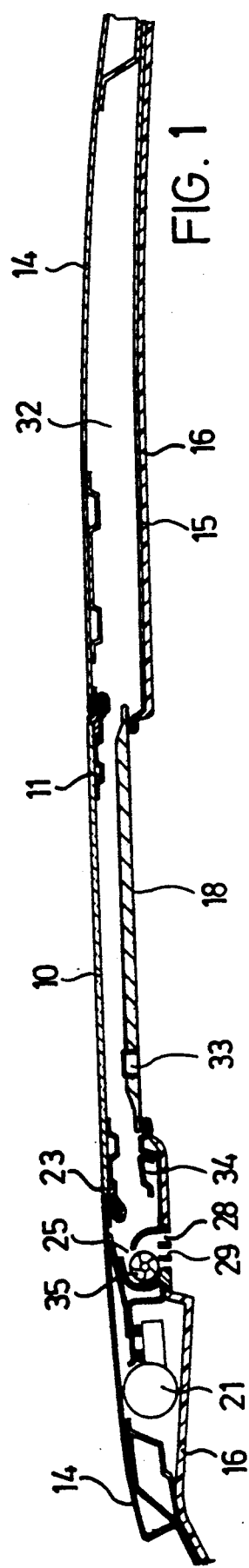

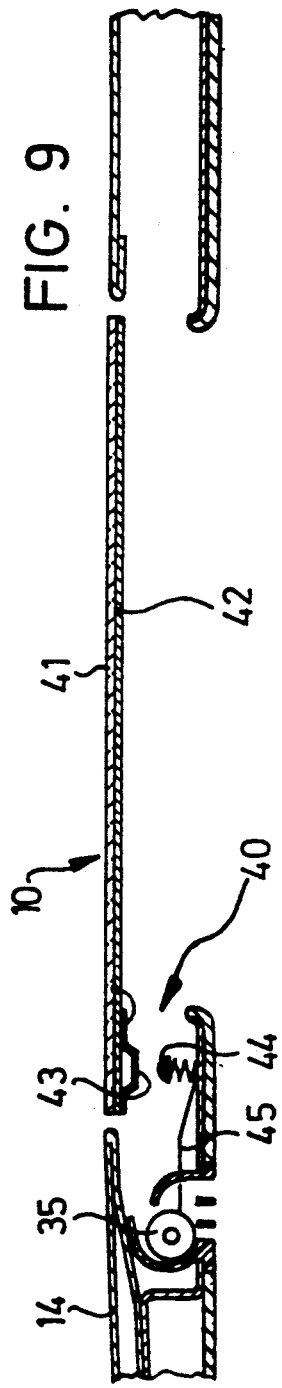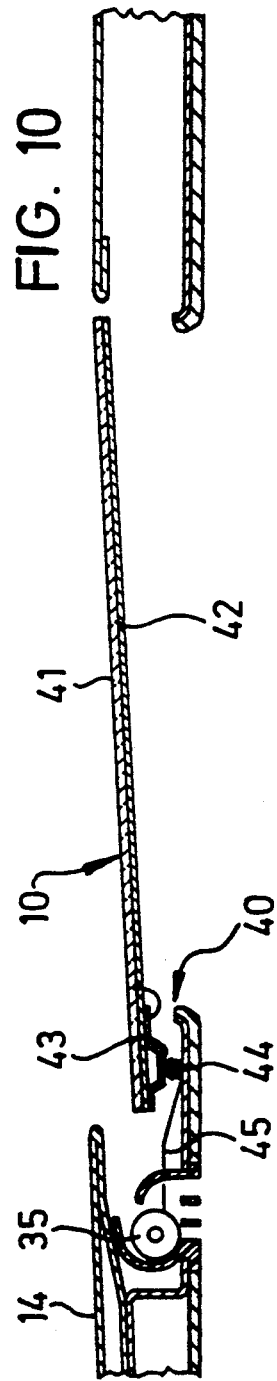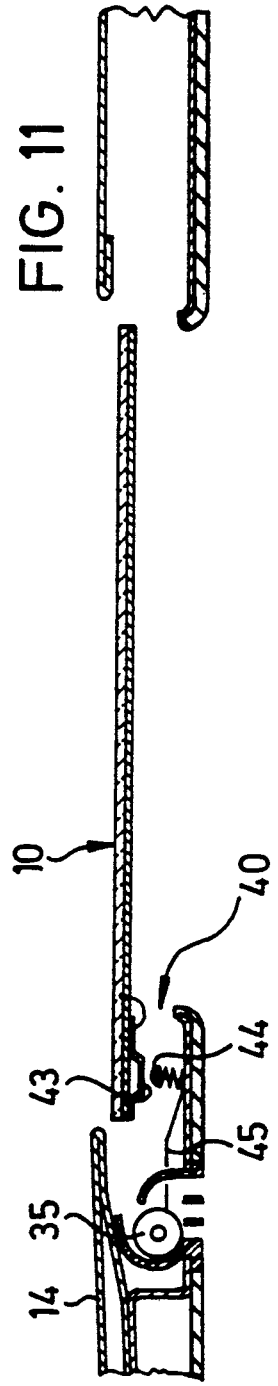

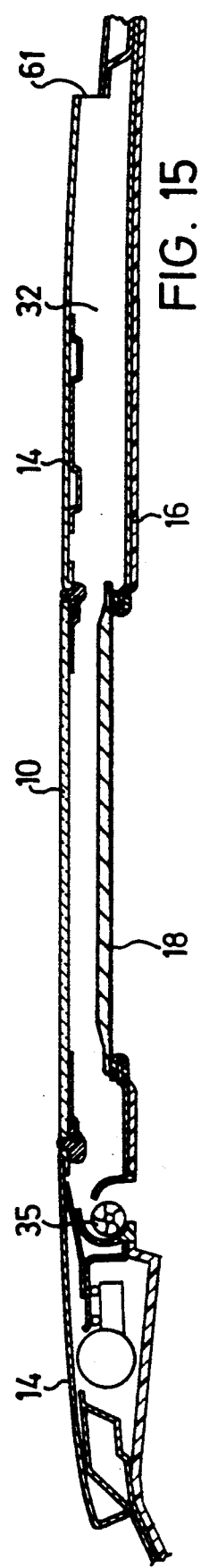
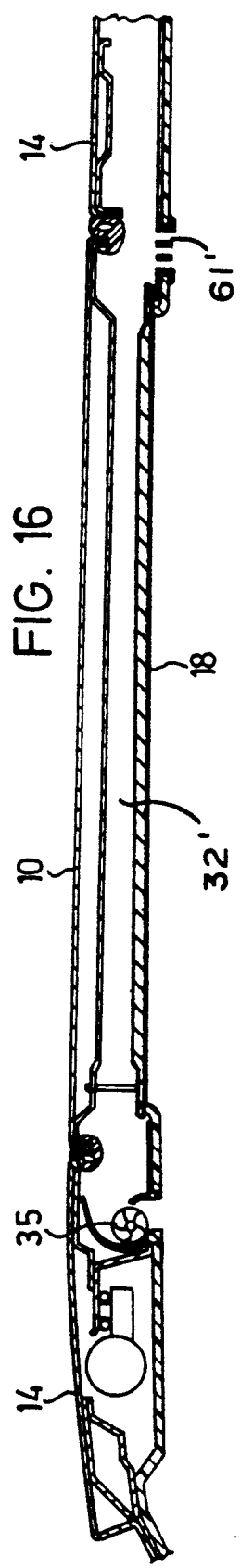
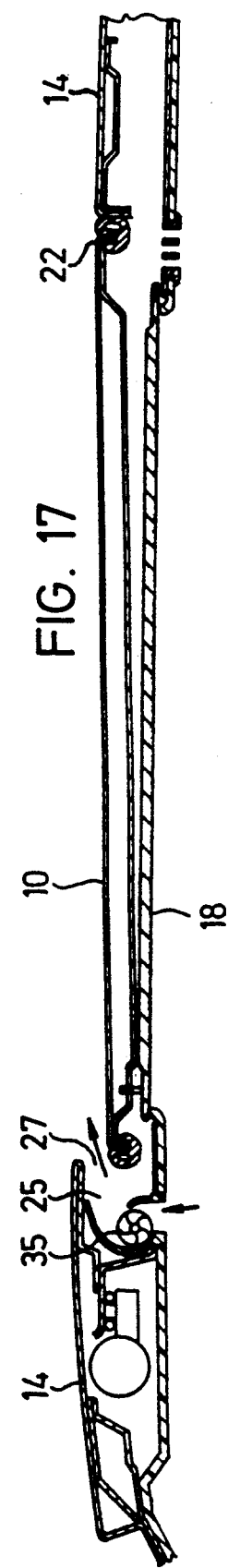

VENTILATOR ROOF FOR VEHICLES

BACKGROUND OF THE INVENTION

The invention relates to a ventilator roof for vehicles having a roof opening formed in a fixed roof surface, which can be closed by means of a cover that can be swung, by pivoting around a pivot axis, at, or near its rear edge, into a ventilation position in which the cover front edge is at a distance below the fixed roof surface while the rear edge of the cover is kept approximately at the height of the fixed roof surface, so that a ventilation gap is formed between the cover front edge and the front edge of the roof opening.

Such roofs are known from U.S. Pat. No. 4,911,497, as well as from U.S. Pat. No. 4,978,165. A common drawback of these prior art ventilator roofs is that they only provide a passive ventilation of the vehicle interior, due to negative pressure occurring above the fixed roof surface during vehicle movement, or due to the rising of warmer air from the vehicle interior, With the vehicle standing, the ventilation effect, thus achieved, is unsatisfactory.

Vehicle roofs with active ventilation have already been developed. Thus, it is known (published German Application DE 36 43 436 A1, FIGS. 1, 2 and 5) to integrate a cross current blower into the cover of a lifting roof, whereby the cover is provided with an air passage slit extending over a major portion of its width and whose edge is encircled by the housing of the cross current blower, from both sides, from above and below. The blower housing forms a radial suction channel or exhaust channel on the cover's inner side, and forms a tangentially directed exhaust or suction channel on the outer cover side.

In accordance with another embodiment that German Application (FIGS. 3, 4 and 6), the cross current blower, in similar manner, is disposed in a wind deflector which is placed in front of the front edge of the roof opening on the fixed roof surface. In these known designs, the blower housing represents an add-on which projects upwardly above the roof surface. For reasons of visual esthetics and aerodynamic considerations (increased CD value), such an arrangement is not desirable.

Moreover, if the blower is integrated into the cover, sealing the roof against rain and wash water becomes a problem; the cover weight increases, and the cover mechanism must be stronger. If the blower is disposed above the roof surface in the wind deflector, ventilation with the cover closed is not possible.

It is also known (published German Application 35 40 546 A1 and Gebrauchsmuster 88 08 782 U1) to attach a motor powered ventilator and a solar energy source powering it to a vehicle lifting roof beneath a translucent cover on a wide carrier element which extends in the medial region of the roof opening in the driving direction of the vehicle. In another embodiment of this lifting roof, a radial ventilator and an associated solar energy source are attached at the underside of the translucent lifting cover (German Begraushsmuster 88 15 676 U1), so that they also are induced into executing the swing movement when the cover is pivoted.

A common drawback of such assemblies is that optical visibility is lost from a considerable portion of the cover area. Moreover, the overall headroom of the roof reaches dimensions which are undesirable for many applications in practice.

SUMMARY OF THE INVENTION

The invention, therefore, has a primary objective to provide a ventilator roof of the kind mentioned above, which not only permits passive ventilation, bu facilitates, in an unobtrusive and space-saving manner, a means of active ventilation which is comfortable and pleasant for the passengers of the vehicle.

This objective is achieved by this invention in that at least one blower, which is powered by an electric motor, is built into a ventilation channel leading from the ventilation gap into the vehicle interior.

In the ventilator roof in accordance with the invention, active ventilation does not require any roof add-on structures which are undesirable from a visual or aerodynamic aspect. The utilizable roof opening and transparent roof surface can be fully sustained regardless of the provisions to obtain active ventilation. The blower is disposed in front of the roof opening and thus at a location, which, with regard to low headroom is not critical. Once the blower is activated, the air flows along the inside of the vehicle's front windshield, thereby preventing air being blown directly onto the vehicle passengers. Due to the lower air resistance in the ventilation channel, the blower located in the ventilation gap can be designed for a lower input power than the existing vehicle blowers.

Preferably, the design is such that the ventilation channel connects the ventilation gap, formed between the front edge of the lowered cover and the front edge of the roof opening, with an air passage-in-a fixed roof liner which is mounted to the underside of the roof surface, below the roof opening. This ensures a particularly attractive appearance for the vehicle interior.

At least one ventilation screen can be inserted into the air passage, and the blower and the ventilation screen can be combined into a single unit. Specifically, the blower may have a housing which is formed of one piece with the ventilation screen, so that the blower housing can be designed as an exchangeable part with a simple ventilation-screen, as utilized with ventilator roofs without active ventilation. Accordingly, the ventilator roof can be easily designed either with or without active ventilation, without changing the visual appearance of the vehicle interior.

In accordance with another embodiment, the blower housing can also be formed by a roof frame which is mounted to the underside of the fixed roof surface and which carries the cover and its associated operating parts.

The cover can be designed as a solar module which supplies current to the electrically powered blower. An example of such a solar module is shown in copending, commonly assigned U.S. patent application Ser. No. 07/663,611 now abandoned. The solar module can be of known construction and a contact device can be provided, in the electric circuit between the solar module and the blower, which closes automatically, whereby the current device can also be designed such that it likewise keeps the electric circuit closed between the solar module and the blower when the cover is in the closed position. An example of a roof with a solar module for supplying current to electric power consuming devices of the vehicle is shown in co-pending, commonly assigned U.S. patent application Ser. No. 723,905, filed Jul. 1, 1991 on.

The blower can be connected to the on-board power supply, in which instance a monitoring step is provided for preventing excessive discharge of the on-board power supply by separating the blower from the on-board power supply when the charge of the on-board power supply falls below a preset threshold value.

At least one time-switch can be disposed in the control circuit of the blower to facilitate activation and/or deactivation of the blower at a predetermined time; or, over a predetermined period, e.g., a gradual deactivation over a period of time.

A thermal switch can be provided for controlling the blower, which automatically effects the active ventilation when a predetermined temperature limit value is surpassed in the vehicle interior. Specifically, the blower can be a cross-current blower or an axial blower. At least one such blower can be medially disposed in the ventilation channel, transverse to the vehicle direction, whereby, free ventilation openings remain at both sides of the blowers. The configuration, however, also can be such that, in the transverse direction, at least one blower, respectively, is arranged on both, the right and left sides, of the ventilation channel, and free ventilation openings remain therebetween.

In order to also provide active ventilation when the cover is closed, ventilation slits can be provided in the rear portion of the vehicle roof which are connected with a compartment between the roof surface and a roof liner. Air from the vehicle interior can be discharged by the blower via this compartment and the ventilation slits, when the cover is in the closed position.

Preferably, the cover, as is known as such from U.S. Pat. No. 4,911,497, can be extended above the roof surface, and can be rearwardly displaced below or above the roof surface into an open position, in which the cover at, least partially, exposes the roof opening.

Further objects, features and advantages of the ventilator roof in accordance with the invention are described in detail below with reference to the accompanying drawings.

BRIEF DESCRIPTION OF THE DRAWINGS

FIGS. 1, 2 and 3 are schematic longitudinal sections through a ventilator roof, with the cover depicted in the closed position; the ventilator position; and with the cover pushed back;

FIGS. 9, 10, 11 are schematic, longitudinal sections through a ventilator roof in various cover positions, indicating the construction of a contact device, which automatically closes when the cover changes into the ventilator position;

FIG. 15 is a schematic, longitudinal sectional view of another embodiment of a roof;

FIGS. 16, 17, 18 are schematic, longitudinal, sectional views, similar to those in FIGS. 1, 2 and 3, for a ventilator roof, in which the cover can be pushed rearwardly above the fixed roof surface.

DETAILED DESCRIPTION OF THE PREFERRED EMBODIMENTS

Figure 4:
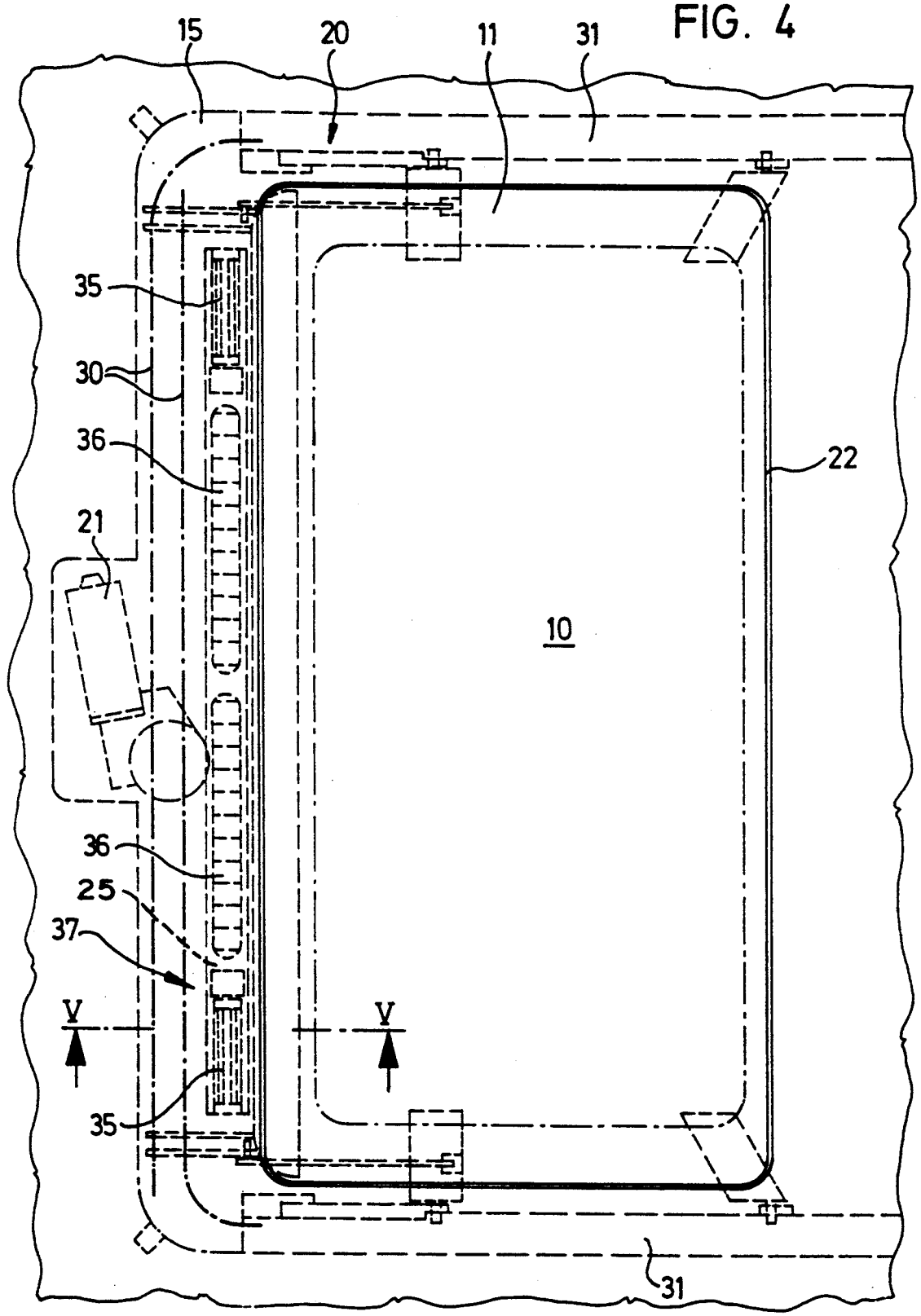
FIG. 4 is a top view onto the ventilator roof according to FIGS. 1 to 3.

The ventilator roof depicted in FIGS. 1 to 5 has a cover 10 made of transparent or translucent material, for instance, glass, which is carried on an encircling cover carrier 11. A sealing profile 12 is disposed on a projecting outer edge of carrier 11 for sealing an edge gap between the outer edge of the cover 10 and the adjacent edge of roof opening 13 in the cover's closed position (FIG. 1). The roof opening 13 is formed in the front part of the fixed roof surface 14 and can be selectively closed by means of cover 10, or can, at least partially, be exposed.

Secured below the roof surface 14, there are disposed a roof frame 15 and a fixed roof headlining 16 defining an opening 17 which is located below the roof opening 13. This opening can be covered by way of a sliding roof headliner 18 (FIGS. 1 and 2).

Cover 10, by way of a displacement mechanism 20, indicated in FIG. 4 only schematically, with associated threaded cables 30, and powered by a drive motor 21, can be pivoted into the FIG. 2 ventilator position around an pivot axis (imaginary), at or, near its rear edge 22, into the FIG. 2 ventilator position, in which the cover front edge 23 is below fixed roof surface 14. To this end, the cover rear edge 22 is at least approximately kept at the height of the roof surface. If, during the movement of the vehicle, there is a negative pressure at the outer side of the roof surface 14, relative to that prevailing in the vehicle interior, an air current is formed which is indicated at numeral 24 in FIG. 2. To this end, the air current 24 traverses a ventilation channel 25 which connects a ventilation gap 27, between the front edge 23 of the lowered cover 10 and the front edge 26 of roof opening 13, with an air passage 28 of roof lining 16. The air passage 28 is below the fixed roof surface 14 and in front of front edge 26 of roof opening 13. A ventilator screen 29 is inserted into air passage 28.

The roof opening 13, in the front part of roof surface 14, can be at least partially opened, whereby the rear edge 22 of cover 10, preferably starting from the FIG. 2 ventilator position, is lowered below the roof surface 14 by an amount which, preferably, is less than the downward slant of the cover front edge 23 in the ventilator position (FIG. 2). In this preferred operational sequence, the cover front edge 23, previously lowered into the ventilator position, is simultaneously lifted into an intermediate position between the ventilator position (FIG. 2) and the closed position (FIG. 1). In this manner, cover 10 is brought into a sliding position, in which it is essentially parallel to roof surface 14 (FIG. 3). Subsequently, cover 10, by means of longitudinal guides 31 (FIG. 4) extending along both sides of roof opening 13 and extending rearwardly therefrom, can be pushed underneath roof surface 14 into an open position in which cover 10 opens the roof opening 13 to a varying degree (FIG. 3). Hereby, cover 10 is received in a compartment 32 between that portion of surface 14 which is rearward of roof openings 13, 17 and the roof lining 16 lying beneath it.

While cover 10 is in the (FIG. 1) closed position, in the (FIG. 2) ventilator position, or in between these two positions, the sliding headliner 18 can be selectively shifted into a position between its closed position (FIG. 1) and a pushed back position (FIG. 3) by grasping a grip molding 33 in order to influence the incidence of light into the vehicle interior through cover 10. As is known from prior art (U.S. Pat. No. 4,312,533), a mechanism can be provided to facilitate the taking along of sliding headliner 18 when cover 10 is moved back into compartment 32. Appropriately, a wind deflector 34 is provided which changes from its rest position (FIGS. 1 and 2) into a working position (FIG. 3) when the cover is slid back. The displacement mechanism 20 can be constructed as described in U.S. Pat. No. 4,911,497 or in copending, commonly assigned U.S. patent application Ser. No. 07/525,603 now U.S. Pat. No. 5,069,500 and, therefore, needs no further detailed explanation.

Figure 5:
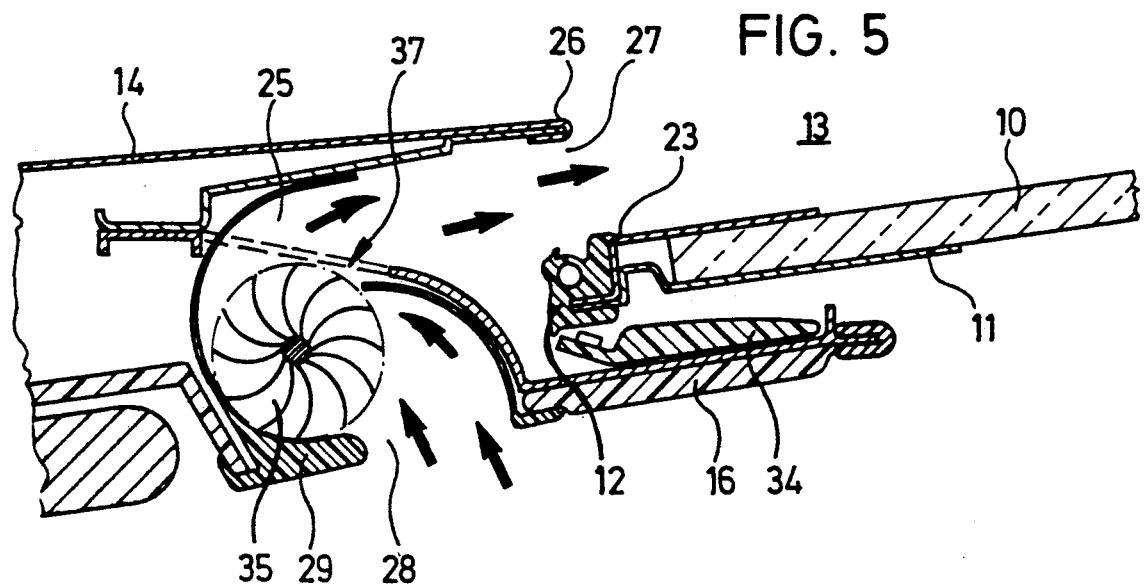
FIG. 5 is a sectional view taken along line V—V of FIG. 4.
Figure 5A:
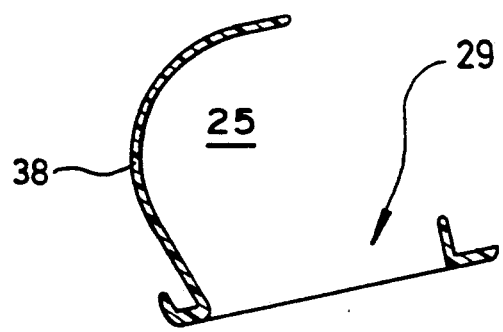
FIG. 5A is a section through a ventilator screen without blower.

In the illustration of the ventilation channel 25 depicted in FIGS. 4, 5 and 5A an electrically powered cross current blower 35 is built on its right and left hand sides, respectively, whereby ventilation openings 36 remain open between the two lateral cross current blowers 35. In the example depicted, the cross current blower 35 and the ventilation screen 29 are combined into one structural unit, designated in its entirety with reference numeral 37, whereby blowers 35 have a housing 38 which is connected, as a one piece unit, with the ventilating screen 29. Appropriately, unit 37 with ventilation screen 29 can be designed as an exchangeable part for a simple ventilation screen, as it is used with a ventilator roof which does not have a blower built into the ventilator channel U.S. Pat. No. 4,911,497 (Published German Applications 38 40 694, A1, P 39 39 054.4 and P 39 30 755.17 and U.S. patent application Ser. No. 07/525,603 now U.S. Pat. No. 5,069,500. It is to be understood that the ventilation screen 29 also may be designed such that it is divided longitudinally, e.g. may have a two-part or multiple-part configuration.

Figure 6:
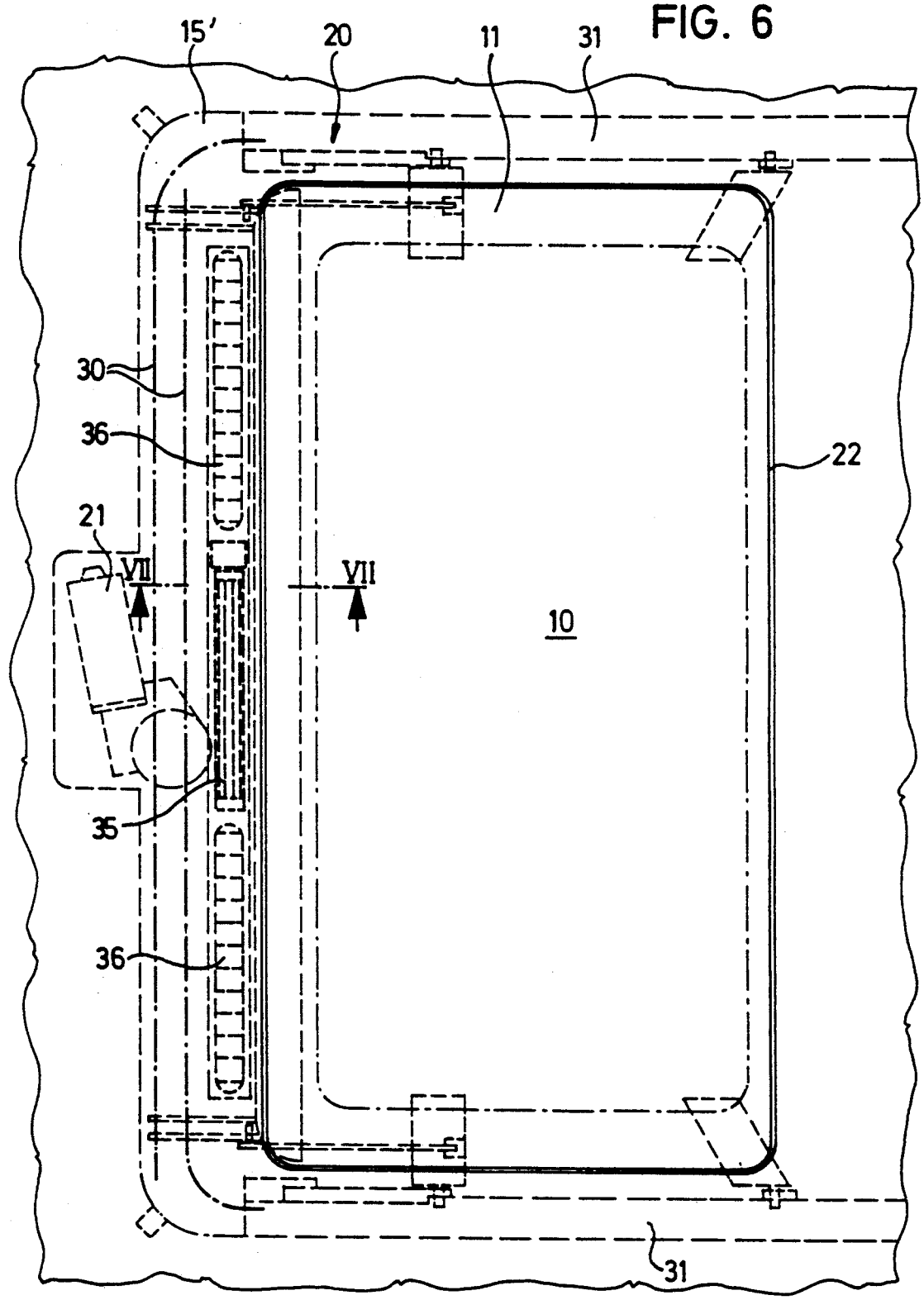
FIG. 6 is a top view similar to FIG. 4, showing a different embodiment of the ventilator roof.
Figure 7:
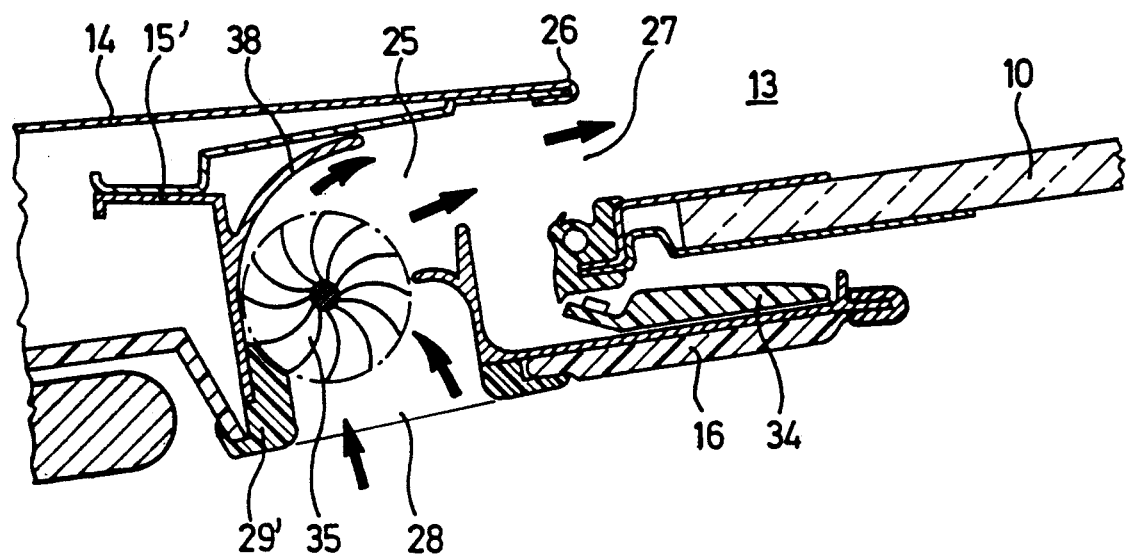
FIG. 7 is a sectional view taken along line VII—VII of FIG. 6.

In a different embodiment, illustrated according to FIGS. 6 and 7, a cross current blower 35 is medially arranged in the ventilation channel 25 in the transverse direction of the vehicle, whereby open ventilation openings 36 remain at both sides of blower 35. In this variation, housing 38' of cross current blower 35 is formed by the roof frame 15', which surrounds the underside of roof opening 13 and carries cover 10, as well as the associated operating parts. In the air passage 28 defined by roof frame 15', a ventilation screen 29' is inserted which, in the area of the cross current blower 35, forms an air inlet for the blower housing 38'.

In a variation of this design, a roof frame forming the blower housing can also be provided for a configuration incorporating multiple blowers, like those, for instance, as depicted in FIG. 4. Conversely, it is also possible to provide a ventilation screen 29, forming the blower housing, with a medial arrangement of the cross current blower, in accordance with FIG. 6.

Figure 8:
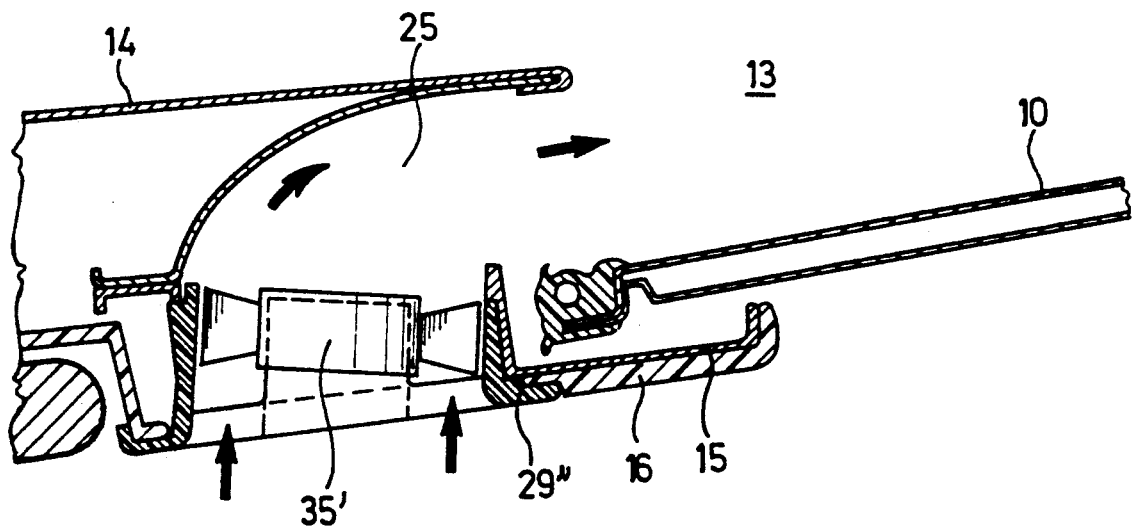
FIG. 8 is a partial, longitudinal sectional view through a variation of a ventilator roof with an axial blower, with the cover in the ventilator position.

FIG. 8 shows a still further variation of the ventilator roof, in which one or several axial blowers 35' are arranged in the ventilator channel 25 adjacent to each other int he transverse direction of the vehicle. In the FIG. 8 configuration, the axial blower 35' or the axial blowers 35' are installed at the ventilation screen 29". Alternatively, it is possible to design the roof frame 15 in such a manner that it constitutes the axial blower housing or the axial blower housings.

Advantageously, cover 10 can be designed as a solar module which provides power for the blowers 35 or 35'. Such a cover 10, designed as a solar module, together with an associated contact device 40, is schematically depicted in FIGS. 9, 10 and 11. Cover 10, here, has an outer glass layer 41 and a translucent solar cell layer 42, contacting the inner side of the glass outer layer, which solar cell layer 42 can be supported on a carrier layer at that side which faces away from the of glass layer 41. The solar cell layer 42 may consist of amorphous or crystalline semiconductor material. The construction of such a solar module is known per se and by itself forms no part of this invention and, therefore, does not require further detailed discussion here. An example of such a solar module is shown in copending, commonly assigned U.S. patent application Ser. No. 07/663,611. Contact device 40 has a contact plate 43 on the underside of cover 10 which is electrically connected with the solar cell layer 42, and further, has a spring contact 44 on the roof frame. The contact device 40 is located in a circuit 45 between the solar cell layer 42 and the electronically powered blower 35, and is schematically indicated in FIG. 10. After cover 10 has been brought into the ventilator position (FIG. 10), contact plate 43 contacts spring contact 44; the circuit 45 between the solar module and the blower 35 is closed; and the blower is in operation. In all other cover positions (for instance, the positions according to FIGS. 9 and 11), circuit 45 is open, in this embodiment.

Alternatively, contact device 40 can be designed such that the spring contact 44 is kept in engagement with contact plate 43, in all of the FIGS. 9, 10 and 11 cover positions, as well as in all intermediate positions between these cover positions, and opens contact device 40 only when cover 10 is pushed back toward a position corresponding to that of FIG. 3. In this connection it is to be understood that designs of the contact device 40, other than those indicated in FIGS. 9–11, may be considered. For instance, contact devices may be used which principally have designs which are similar to those described in greater detail in the above-noted, commonly assigned co-pending U.S. application Ser. No. 723,905.

Figure 12:
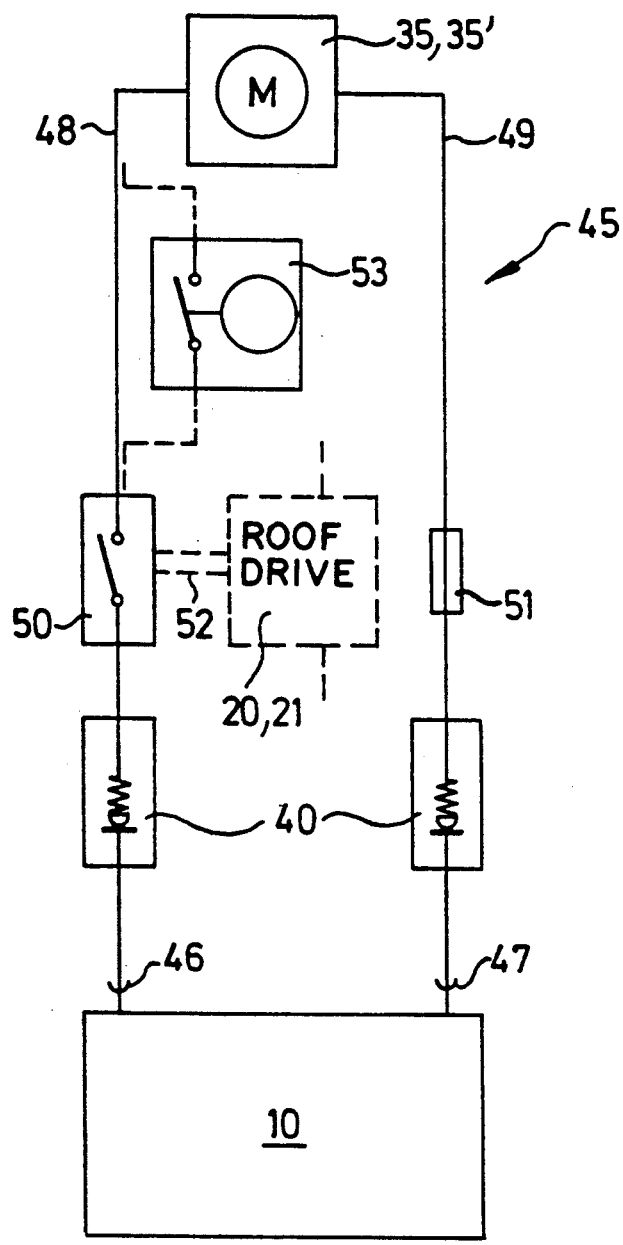
FIGS. 12, 13, 14 are various embodiments for the supply and control circuits of the blower.

An example of a circuit 45 between the solar module of cover 10 and the electrically powered blower 35 or 35' is shown in FIG. 12, in which the motor driving blower is indicated at "M". As long as radiation is prevailing, the solar module emits a direct voltage between terminals 46 and 47, which can be applied at the blower motor "M" via two leads 48 and 49. In each of the two leads 48, 49, there is a contact mechanism, which automatically closes, at least when cover 10 has been brought into the ventilator position (FIGS. 2, 8 and 10). The contact device 40 employed, for instance, can be of the kind shown in FIGS. 9 to 11. In series with contact device 40, in lead 48, there is an ON/OFF switch 50, while int he other lead 49, in addition to the contact device 40, there is a fuse 51. The ON/OFF switch 50 can be designed for manual operation. Alternatively, or additionally, it can be provided that switch 50, after each cover 10 movement, is placed in the OFF mode, which eliminates unwanted blower actuations, at the very start and also prevents blower motor "M" from starting operation when cover 10 is driven from the closed into the opened position (and vice versa). Thus, the cover traverses the ventilator position, thereby closing the contact device 40. For such an OFF mode, switch 50, as indicated at 52, is connected with the roof drive 20, 21. In place of ON/OFF switch 50, or additionally in series thereto, a thermal circuit breaker 53 can be provided, which is open at relatively low temperatures, and which closes when the vehicle interior temperature surpasses an adjustable or specific predetermined threshold value.

Figure 13:
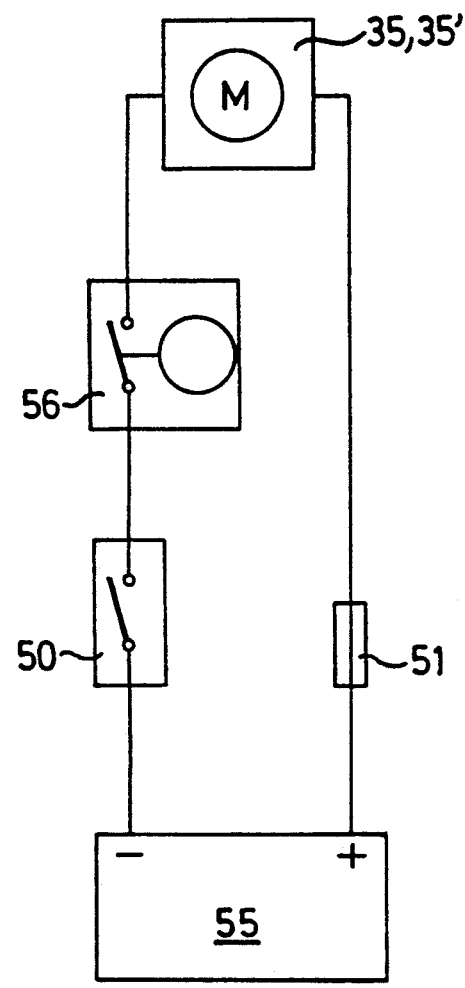

However, the blowers 35 or 35' may also be connected to the on-board vehicle power supply. A simple block diagram therefor is depicted in FIG. 13, whereby the battery 55 feeding the on-board power supply is connected with the one terminal of blower motor "M" via the fuse 51 and is connected via a switching series consisting of the ONOFF switch 50 and a cover position switch 56 with the other terminal of blower motor "M". Switch 50 has a function which is illustrated by way of FIG. 12. The cover position switch 56, dependent upon the respective position of the cover 10, is automatically brought into the closed position, at least, when cover 10 reaches the ventilation position. The respective cover position can be queried via a microswitch, proximity switch, or the like, directly at the cover. Alternatively, it is also possible to detect the cover position immediately at the roof drive 20, 21.

Figure 14:
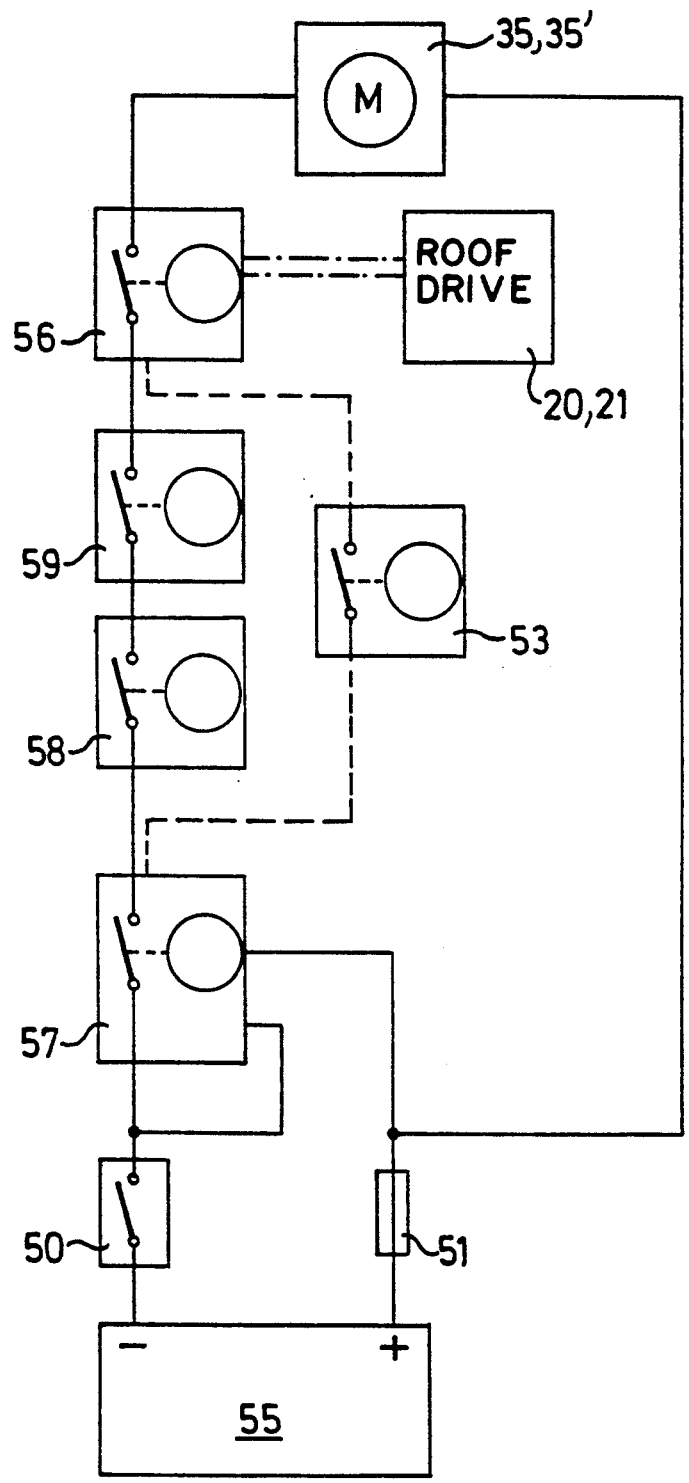

In accordance with FIG. 14, the circuit layout along the lines of FIG. 13 can be further refined. In the control circuit of blowers 35 or 35', there is, additionally, a monitoring unit 57 that separates the blower from the on-board power supply when the charge of the on-board power source (battery 55) falls below a preset threshold value. This eliminates an undue progressive discharge of the on-board power source by the blower. Two time-switches 58 and 59 are also arranged in series with the monitoring unit 57. One time switch 58 detects the time and can be adjusted such that at preselected times it closes and/or opens. The other time switch 59 closes for a preselected time period. The time switches 58 and 59 permit, among other functions, intake operation of blowers 35, 35' at a predetermined time and/or a gradual deactivation stage over a certain time period. In addition to the time switches or alternatively thereto, a thermal circuit breaker 53, as described by way of FIG. 12, can be provided as indicated. Also, selectively supplying the blowers from either the on-board power supply or from a solar current source is another option.

While in the embodiments according to FIGS. 1, 2 and 3, the compartment 32 which receives the pushed back cover 10 is closed to the rear, FIG. 15 shows a variation thereof in which ventilation slits 61 are provided in the rear portion of the vehicle roof. Ventilation slits 61 communicate with the compartment 32 between the fixed roof surface 14 and the roof lining 16. In this embodiment, the blowers 35 or 35' can be utilized to discharge air from the vehicle interior via the ventilation slits 61, while cover 10 is in the closed position.

The embodiment, in accordance with FIGS. 16, 17, and 18, is essentially different from the configuration in FIGS. 1, 2 and 3, in that the cover 10, for the purpose of opening the roof opening 13, is not lowered rearwardly and subsequently slid below the roof surface, but instead, is tilted with its rear edge 22 above roof surface 16 and, then, in the manner of a spoiler roof, is shifted rearwardly over the fixed roof surface 14. A displacement mechanism that is suitable for such a movement sequence is described in U.S. Pat. No. 4,978,165 and does not require further discussion here. In this roof, also, at least one electrically powered blower 35 or 35' is built into the ventilation channel 25 leading from the ventilation gap 27 into the vehicle interior which, especially, can provide active ventilation of the interior of a standing vehicle.

In particular, in this embodiment, while cover 10 is in the closed position, the blowers 35 or 35' can be utilized to discharge air from the vehicle interior into a compartment 32', that is located between the cover 10 and the cover inside headliner 18. From compartment 32', the discharged air is able to flow back into the vehicle interior space via ventilation slits 61' that are provided in the rear area of the roof openings 13, 17. In this way, air is dischargable from a front portion of the vehicle interior space by the blower and recirculated back to the vehicle interior space via compartment 32' and the ventilation slits 61' in order to make the vehicle interior space more comfortable when the vehicle is stopped.

While we have shown an described various embodiments in accordance with the present invention, it is understood that the same is not limited thereto, but is susceptible of numerous changes and modifications as known to those skilled in the art, and we, therfore, do not wish to be limited to the details shown and described herein, but intend to cover all such changes and modifications as are encompassed by the scope of the appended claims.

We claim:

1. Ventilator roof for vehicles having a fixed roof surface with a roof opening therein, a cover which is pivotable, about a pivot axis that is at least near a rear edge of the cover while the rear edge of the cover is kept approximately at the height of the fixed roof surface, between a closed position and both a ventilation position in which a front edge of the cover is below the fixed roof surface and a ventilation gap is formed between the front edge of the cover and a front edge of the roof opening and a retracted position in which the cover has bee moved rearwardly to expose the roof opening; wherein at least one electrically powered blower is fixed relative to the fixed roof surface within a portion of a ventilation channel which leads between a vehicle interior space and the outside environment, via the ventilation gap, when the cover is in said ventilation position; wherein said at least one blower is completely disposed below the fixed roof surface, heightwise, between the fixed roof surface and a vehicle headlining in an area located forwardly of the front edge of the roof opening where the presence thereof minimally impacts on passenger headroom and leaves visibility through the roof opening unimpeded; and wherein the at least one blower occupies only a portion of the ventilation channel in a transverse vehicle direction in a manner leaving free ventilation openings laterally of at least one end of the at least one blower.

2. Ventilator roof in accordance with claim 1, wherein the ventilation channel connects the ventilation gap with the vehicle interior space by an air passage in a fixed roof liner which is connected to an underside of the fixed roof surface at least in an area located in front of the roof opening.

3. Ventilator roof in accordance with claim 1, wherein at least one ventilation screen is located in the air passage.

4. Ventilator roof in accordance with claim 3, wherein the blower and ventilation screen are combined into a self-contained unit.

5. Ventilator roof in accordance with claim 4, wherein the blower has a housing with which the ventilation screen is formed as one piece.

6. Ventilator roof in accordance with claim 5, wherein the one piece housing and ventilation screen is an exchangeable part with respect to a part formed of only a ventilation screen.

7. Ventilator roof according to claim 1, wherein a roof frame surrounds the roof opening at an underside of the fixed roof surface and carries the cover and associated operating parts; and wherein the blower has a housing which is formed by the roof frame.

8. Ventilator roof according to claim 1, wherein the cover carries a solar module for supplying power to the electrically powered blower.

9. Ventilator roof in accordance with claim 8, wherein a contact device is provided, in an electric circuit between the solar module and the blower, which automatically closes, at least when the cover is in the ventilation position.

10. Vehicle roof in accordance with claim 8, wherein a contact device is provided, in an electric circuit between the solar module and the blower, which forms a means for keeping the electric circuit between the solar module and the blower in a closed condition, until the cover has been moved rearwardly into a substantially fully retracted position.

11. Ventilator roof according to claim 10, wherein the blower is also connected to an on-board vehicle power supply.

12. Ventilator roof in accordance with claim 11, wherein a monitoring means is provided for separating the blower from the on-board power supply when a charge level of the on-board power supply falls below a predetermined threshold value.

13. Ventilator roof in accordance with claim 11, wherein the blower is provided with a control circuit having a time-switch.

14. Ventilator roof in accordance with claim 1, wherein the blower is provided with a control circuit having a thermal switch for controlling operation of the blower.

15. Ventilator roof according to claim 1, wherein the blower is a cross current blower.

16. Ventilator roof according to claim 1, wherein the blower is an axial blower.

17. Ventilator roof according to claim 1, wherein said at least one blower is medially arranged in the ventilation channel in a transverse vehicle direction; and wherein free ventilation openings remain at both sides of the blower.

18. Ventilator roof in accordance with claim 1, wherein said at least one blower is arranged on each of right and left sides of the ventilation channel, relative to a transverse vehicle direction; and wherein free ventilation openings remain therebetween.

19. Ventilator roof in accordance with claim 1, wherein the cover is also mounted for displacement into at least one of an open position in which the rear edge of the cover is lowered below the fixed roof surface and the cover is displaced rearwardly under the fixed roof surface, and an open position in which the cover is extended above the fixed roof surface and displaced rearwardly over the fixed roof surface, whereby the roof opening is at least partially exposed.

20. Ventilator roof according to claim 1, wherein the blower is connected to an on-board vehicle power supply; and wherein a monitoring means is provided for separating the blower from the on-board power supply when a charge level of the on-board power supply falls below a predetermined threshold value.

21. Ventilator roof for vehicles having a fixed roof surface with a roof opening therein, a cover which is pivotable, about a pivot axis that is at least near a rear edge of the cover while a rear edge of the cover is kept approximately at the height of the fixed roof surface, between a closed position and a ventilation position in which a front edge of the cover is below the fixed roof surface and a ventilation gap is formed between the front edge of the cover and a front edge of the roof opening; wherein at least one electrically powered blower is mounted in a fixed position relative to the fixed roof surface within a ventilation channel which leads exclusively from the outside environment, through the ventilation gap, into a vehicle interior space when the cover is in said ventilation position; wherein ventilation slits are provided in a rear portion of the fixed roof surface, said slits communicating with a compartment that is located between the fixed roof surface and a roof lining; and wherein air is recirculated from the vehicle interior space by the blower via said compartment and the ventilation slits, when the cover is int he closed position.

* * * * *